United States Patent
Oka et al.

(10) Patent No.: US 7,654,538 B2
(45) Date of Patent: Feb. 2, 2010

(54) GASKET

(75) Inventors: Nobuyuki Oka, Fujisawa (JP); Yoshifumi Kojima, Fujisawa (JP); Atsushi Koga, Fujisawa (JP); Kenichi Fujimoto, Fujisawa (JP); Kazuhisa Senda, Fujisawa (JP); Masayuki Kishimoto, Fujisawa (JP); Shunji Ueda, Fujisawa (JP); Nobuyuki Shintaku, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/527,480

(22) PCT Filed: Aug. 29, 2003

(86) PCT No.: PCT/JP03/11078

§ 371 (c)(1),
(2), (4) Date: Mar. 11, 2005

(87) PCT Pub. No.: WO2004/025148

PCT Pub. Date: Mar. 25, 2004

(65) Prior Publication Data

US 2005/0248101 A1  Nov. 10, 2005

(30) Foreign Application Priority Data

Sep. 12, 2002  (JP) ............................... 2002-266538

(51) Int. Cl.
*F16J 15/02* (2006.01)
*G11B 17/02* (2006.01)

(52) U.S. Cl. ..................... 277/644; 277/650; 360/97.02

(58) Field of Classification Search ................. 277/644, 277/650, 596; 360/97.02
See application file for complete search history.

(56) References Cited

U.S. PATENT DOCUMENTS

| 4,342,460 | A | * | 8/1982 | Eng | 277/312 |
| 5,152,538 | A | * | 10/1992 | Mims | 277/575 |
| 5,322,299 | A | * | 6/1994 | Terai | 277/596 |
| 5,692,758 | A | * | 12/1997 | Wikstrom | 277/591 |
| 6,259,036 | B1 | * | 7/2001 | Farnworth | 174/260 |
| 6,346,330 | B1 | * | 2/2002 | Huang et al. | 428/414 |

(Continued)

FOREIGN PATENT DOCUMENTS

EP  1488908 A1 * 12/2004

(Continued)

*Primary Examiner*—Alison K Pickard
(74) *Attorney, Agent, or Firm*—Jacobson Holman PLLC

(57) ABSTRACT

A high-performance gasket (1) capable of coping with a reduction in size and developing a sealing property without producing a squeeze-out at the time of attachment and using a material having a hardness range of 30 to 80 degrees (JIS durometer type A), wherein the requirement of $W1/W0<0.9$ is satisfied where the bonding width of a base part (1a) is (W0) and the width thereof at a position half a height from the bonding part of the base part (1a) to the tip end of a main bead part (2) is (W1), the requirement of $1.15<H/W0<1.80$ is satisfied where the height from the bonding part of the base part (1a) to the tip end of the main bead part (2) is (H), the requirement of $L/W0>=3$ is satisfied where the length of the non-bonded portion of the base part (1a) around the cross-section thereof excluding the bonded portion is (L), and the compressibility of the gasket when compressed is 13.5% or higher.

2 Claims, 14 Drawing Sheets

U.S. PATENT DOCUMENTS

| | | | |
|---|---|---|---|
| 6,494,464 B1 * | 12/2002 | Chandler et al. | 277/628 |
| 6,523,833 B1 * | 2/2003 | Ishigaki et al. | 277/650 |
| 6,670,017 B2 * | 12/2003 | Huang et al. | 428/66.4 |
| 6,876,515 B2 * | 4/2005 | Unno | 360/97.02 |
| 6,887,413 B1 * | 5/2005 | Schumacher | 264/135 |
| 7,007,954 B2 * | 3/2006 | Travers | 277/644 |
| 7,063,911 B1 * | 6/2006 | Nagai et al. | 429/35 |
| 7,195,800 B2 * | 3/2007 | Sugano et al. | 427/430.1 |
| 2002/0044376 A1 * | 4/2002 | Serizawa et al. | 360/97.02 |
| 2002/0045046 A1 * | 4/2002 | Sasaki et al. | 428/408 |
| 2005/0035560 A1 * | 2/2005 | Segawa et al. | 277/634 |
| 2006/0074170 A1 * | 4/2006 | Kojima et al. | 524/474 |

FOREIGN PATENT DOCUMENTS

| | | |
|---|---|---|
| JP | 60-182562 | 12/1985 |
| JP | 5-94571 | 12/1993 |
| JP | 7-166563 | 6/1995 |
| JP | 11-336108 | 12/1999 |
| JP | 2001-280507 | 10/2001 |
| JP | 2001-311470 | 11/2001 |
| JP | 2001-316562 | 11/2001 |
| WO | WO01/66979 | 9/2001 |

* cited by examiner

FIG. 5

EVALUATION RESULTS

| | EXAMPLES | | | | | | | | | | | COMPARATIVE EXAMPLES | | | | | | | | |
|---|---|---|---|---|---|---|---|---|---|---|---|---|---|---|---|---|---|---|---|
| CONSTRUCTION | 1 | 2 | 3 | 4 | 5 | 6 | 7 | 8 | 9 | 10 | 11 | 1 | 2 | 3 | 4 | 5 | 6 | 7 | 8 | 9 |
| GASKET CROSS-SECTION SHAPE | A | B | C | D | E | B | B | D | B | B | A | F | G | H | I | J | D | D | D | A |
| R OF Z-PART | 0.15 | 0.25 | 0.25 | 0.40 | 0.40 | 0.30 | 0.25 | 0.25 | 0.40 | 0.25 | 0.25 | 0.25 | 0.15 | — | 0.50 | 0.25 | — | — | 0.40 | 0.40 | 0.40 | 0.40 |
| W1/W0 | 0.66 | 0.81 | 0.74 | 0.85 | 0.70 | 0.81 | 0.81 | 0.85 | 0.81 | 0.81 | 0.66 | 1.00 | 1.00 | 0.68 | 0.68 | 0.80 | 0.85 | 0.85 | 0.85 | 0.66 |
| H/W0 | 1.75 | 1.40 | 1.40 | 1.27 | 1.15 | 1.40 | 1.40 | 1.27 | 1.40 | 1.40 | 1.75 | 1.40 | 1.40 | 1.15 | 1.89 | 1.10 | 1.27 | 1.27 | 1.27 | 1.75 |
| L/W0 | 3.81 | 3.20 | 3.12 | 3.00 | 3.00 | 3.20 | 3.20 | 3.00 | 3.20 | 3.20 | 3.81 | 3.80 | 3.37 | 2.67 | 4.15 | 3.01 | 3.00 | 3.00 | 3.00 | 3.81 |
| (1) SEALING PROPERTY (PRESENCE/ABSENCE OF LEAKAGE) | ○ | ○ | ○ | ○ | ○ | ○ | ○ | ○ | ○ | ○ | ○ | × | × | × | × | × | ○ | ○ | ○ | × |
| (2) COUNTERFORCE | ○ | ○ | ○ | ○ | ○ | ○ | ○ | ○ | ○ | ○ | ○ | × | × | ○ | ○ | × | ○ | × | ○ | ○ |
| (3) SQUEEZE-OUT AT THE TIME OF ATTACHMENT | ○ | ○ | ○ | ○ | ○ | ○ | ○ | ○ | ○ | ○ | ○ | × | × | ○ | × | × | ○ | ○ | × | × |
| (4) HARDNESS (DUROMETER TYPE A) | 45 | 45 | 45 | 45 | 45 | 61 | 33 | 33 | 78 | 60 | 31 | 45 | 45 | 45 | 45 | 45 | 15 | 83 | 25 | 25 |
| (5) OUTGASSING PROPERTY | ○ | ○ | ○ | ○ | ○ | ○ | ○ | ○ | ○ | ○ | ○ | ○ | ○ | ○ | ○ | ○ | × | ○ | ○ | ○ |
| (6) MOLDABILITY | ○ | ○ | ○ | ○ | ○ | ○ | ○ | ○ | ○ | ○ | ○ | × | ○ | ○ | × | × | × | ○ | ○ | ○ |
| (7) BONDING PROPERTY | ○ | ○ | ○ | ○ | ○ | ○ | ○ | ○ | ○ | ○ | ○ | ○ | ○ | ○ | ○ | ○ | ○ | ○ | ○ | ○ |
| (8) PRESENCE/ABSENCE OF BUCKLING | ○ | ○ | ○ | ○ | ○ | ○ | ○ | ○ | ○ | ○ | ○ | ○ | ○ | ○ | × | ○ | ○ | ○ | ○ | × |

GASKET

This is a nationalization of PCT/JP03/011078 filed Aug. 29, 2003 and published in Japanese.

TECHNICAL FIELD

The present invention relates to a gasket that seals between two members, and relates to a gasket used as a seal, for example, in a top cover of a hard disk unit or in an electronic apparatus such as a fuel cell, particularly in the field of precision apparatus that prevents penetration of moisture, gas, and dust and also requires an outgassing property.

BACKGROUND ART

As a prior art of a cross-sectional shape of a gasket for a top cover in a hard disk unit, there is one described in patent document 1 (Japanese Patent Application Laid-open No. 2001-280507).

In this gasket, it is assumed to be preferable that, regarding the cross section in a direction generally perpendicular to the extension direction of a sealing material (gasket), Lm/Lp is 3 or less where the length of the contact surface with the cover member is Lp and the length of the non-bonded portion with the cover member is Lm.

However, in recent years, scale reduction of hard disk units is advancing and, in accordance therewith, it is inevitably becoming necessary to make a smaller gasket for a top cover.

Actually, as shown in FIG. 11, a gasket 101 is bonded to a gasket attachment surface having a small width.

When the gasket having a cross-sectional shape described in the patent document 1 is used in a top cover of such a hard disk unit having a reduced scale, a squeeze-out portion 102 that squeezes out to the inside of the hard disk unit is produced in a gasket 101, as shown in FIG. 12, at the time of attaching the top cover to a hard disk box body. This squeeze-out portion 102 of the gasket raises a problem of being brought into contact with a component in the inside, such as a disk.

On the other hand, when the whole is reduced in scale while maintaining the gasket having a cross-sectional shape described in the patent document 1 to have a ratio of Lm/Lp being 3 or less in order that the squeeze-out portion of the gasket does not raise a problem, the height of the gasket 201 is too small, as shown in FIG. 13, whereby the sealing property between the gasket 201 and the hard disk box body decrease, so that the gasket cannot prevent penetration of gas or dust, failing to exhibit a function as a gasket.

Also, the patent document 1 describes that "a good close adhesion property is obtained by letting the sealing material have a low hardness (70 degrees or less)"; however, when the sealing material is too soft, a suitable shape cannot be maintained and a buckling is produced at the time of compression depending on the cross-sectional shape of the gasket, thereby invoking poor sealing property and squeeze-out. Also, in order to reduce the hardness, a large amount of plasticizer must be used, and this causes generation of outgas. Adhesion of the components of the outgas to the disk causes an error operation of the hard disk. Further, too much softness causes poor moldability.

DISCLOSURE OF THE INVENTION

The present invention has been made in view of the prior art, and an object thereof is to provide a high-performance gasket that conforms to scale reduction and exhibits a sealing property without producing a squeeze-out at the time of attachment.

In order to achieve the object, the present invention is a gasket for sealing between two members, using a material within a hardness range of 30 to 80 degrees (JIS durometer type A) and having a main bead portion that protrudes from a base provided in one member to the other member side, in which $W1/W0<0.9$ is satisfied where the bonding width of the base bonded to the one member is $W0$, and the width at the position of half the height from the bonding portion of the base with the one member to the tip end of the main bead portion is $W1$, $1.15<H/W0<1.80$ is satisfied where the height from the bonding portion of the base with the one member to the tip end of the main bead portion is $H$, $L/W0 \geq 3$ is satisfied where the length of a non-bonded portion around a cross-section excluding a portion of the base bonded to the one member is $L$, and the compression ratio at the time of being compressed between the two members is 13.5% or more.

According to this configuration, even if a pressure is applied to the gasket from the other member at the time of attachment, the squeeze-out is not produced, thereby preventing the squeeze-out from raising a problem by being brought into contact with other components. Also, since the gasket is ensured to have a sufficient height, the gasket is compressed to the other member with certainty, thereby ensuring a sealing property and preventing the penetration of gas, dust, and the like.

Also, it is possible to prevent a situation in which, because of the hardness of the gasket being too soft, a suitable shape cannot be maintained and a buckling is produced at the time of compression depending on the cross-sectional shape of the gasket, invoking poor sealing property and squeeze-out. Also there is no need to use a large amount of plasticizer in order to reduce the hardness, so that the generation of outgas can be restrained. Therefore, the error operation of the hard disk due to the components of the outgas adhering to the disk can be restrained. Further, it is possible to prevent the moldability from becoming poor. In addition, it is possible to prevent decrease of the counterforce due to non-occurrence of collapse caused by the gasket having a too large hardness.

Here, the width direction in the bonding width $W0$ and the width $W1$ refers to the width in a cross section that is generally perpendicular to the direction in which the gasket extends.

It is suitable that the tip end of the main bead portion is $R=0.1$ mm or more.

This facilitates the compression of the main bead portion, whereby the gasket is compressed to the other member with certainty, and the sealing property can be ensured.

It is suitable that an adhesive is applied in advance to the one member; the gasket is molded by inserting the one member to which the adhesive is applied; and the gasket is integrally provided in the one member.

This facilitates production, and the production process can be simplified.

It is suitable that the material of the gasket is made of an olefin-series elastomer compound.

This allows that, even if the gasket is exposed to a higher temperature of 100° C. or more as an environment of use, the performance is not deteriorated and the product quality is improved.

Thus, in view of heat resistance, it is preferable to use an olefin-series elastomer compound among thermoplastic elastomer compounds. Here, the construction of an olefin-series thermoplastic elastomer in the olefin-series thermoplastic elastomer compound is made of one that contains ethylene/propylene/non-conjugate diene terpolymer rubber or ethylene/propylene copolymer rubber and polypropylene-series resin as well as a plasticizer as major components.

It is suitable that the tip end of the main bead portion is in contact with the center of the contact surface width of the other member.

This allows the main bead portion of the gasket to be in contact with the other member with certainty without squeezing out from the contact surface width of the other member, thereby exhibiting a sealing property.

Here, the contact surface width of the other member refers to the width of the surface in a cross section that is generally perpendicular to the direction in which the contact surface of the other member extends in the same manner as the gasket, in the same manner as the width direction of bonding width W0 or width W1. The contact surface of the other member is a surface of the other member that protrudes to the gasket side in opposition to the gasket.

It is suitably used in a top cover of a hard disk unit.

BRIEF DESCRIPTION OF THE DRAWINGS

FIG. 5 is a view showing evaluation results of an evaluation experiment.

BEST MODES FOR CARRYING OUT THE INVENTION

Hereafter, with reference to the drawings, preferable embodiments of this invention will be described in detail in an exemplifying manner. However, the dimension, material, shape, and the relative arrangement thereof of the constituent components described in this embodiment are not intended to limit the scope of this invention only to them unless a specific description is given.

Here, the one applied particularly to a hard disk unit will be described; however, it may be used as a seal in an electronic apparatus such as a fuel cell, particularly in the field of precision apparatus that prevents penetration of moisture, gas, and dust and also requires an outgassing property.

First Embodiment

Figure 1:
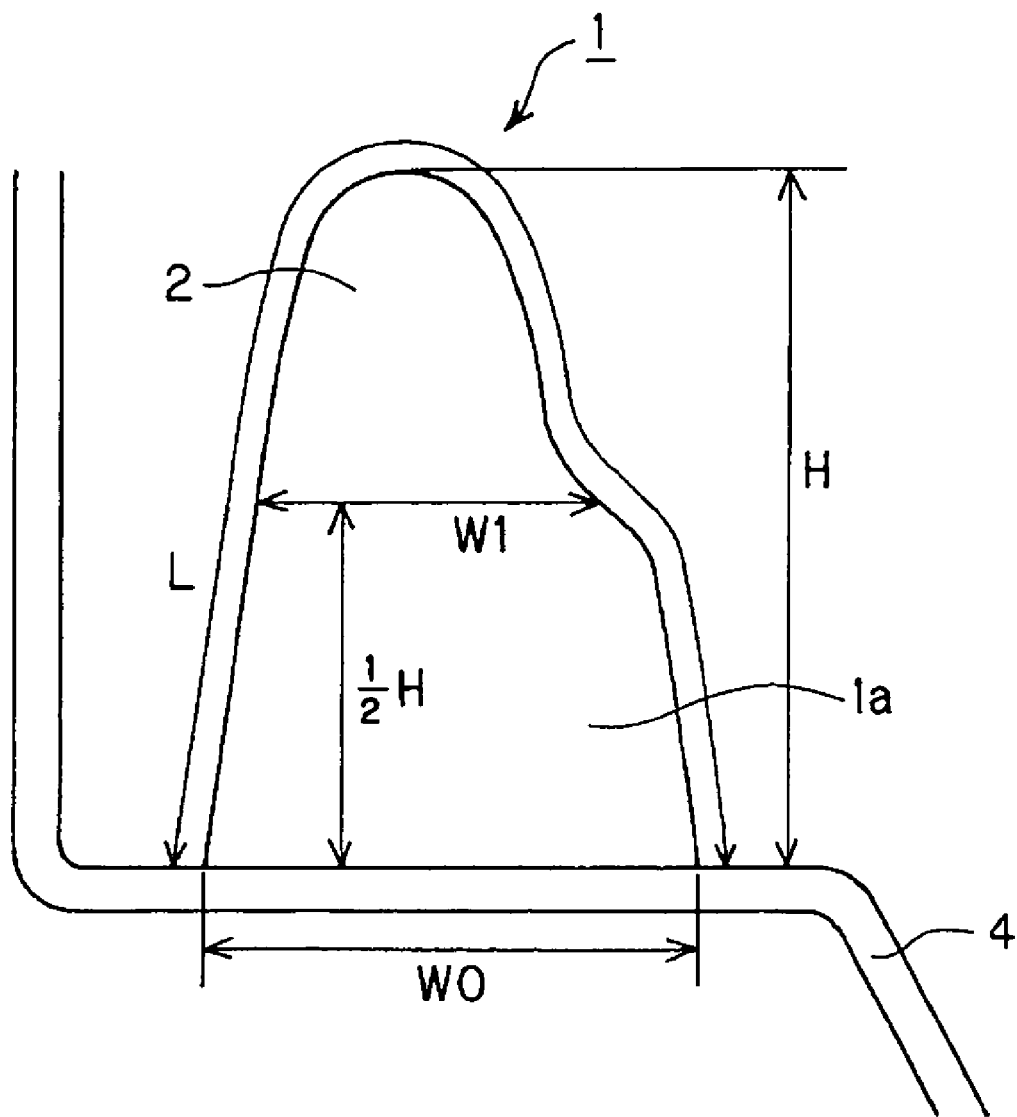
FIG. 1 is a cross-sectional view showing a gasket according to a first embodiment of the present invention.
Figure 2:
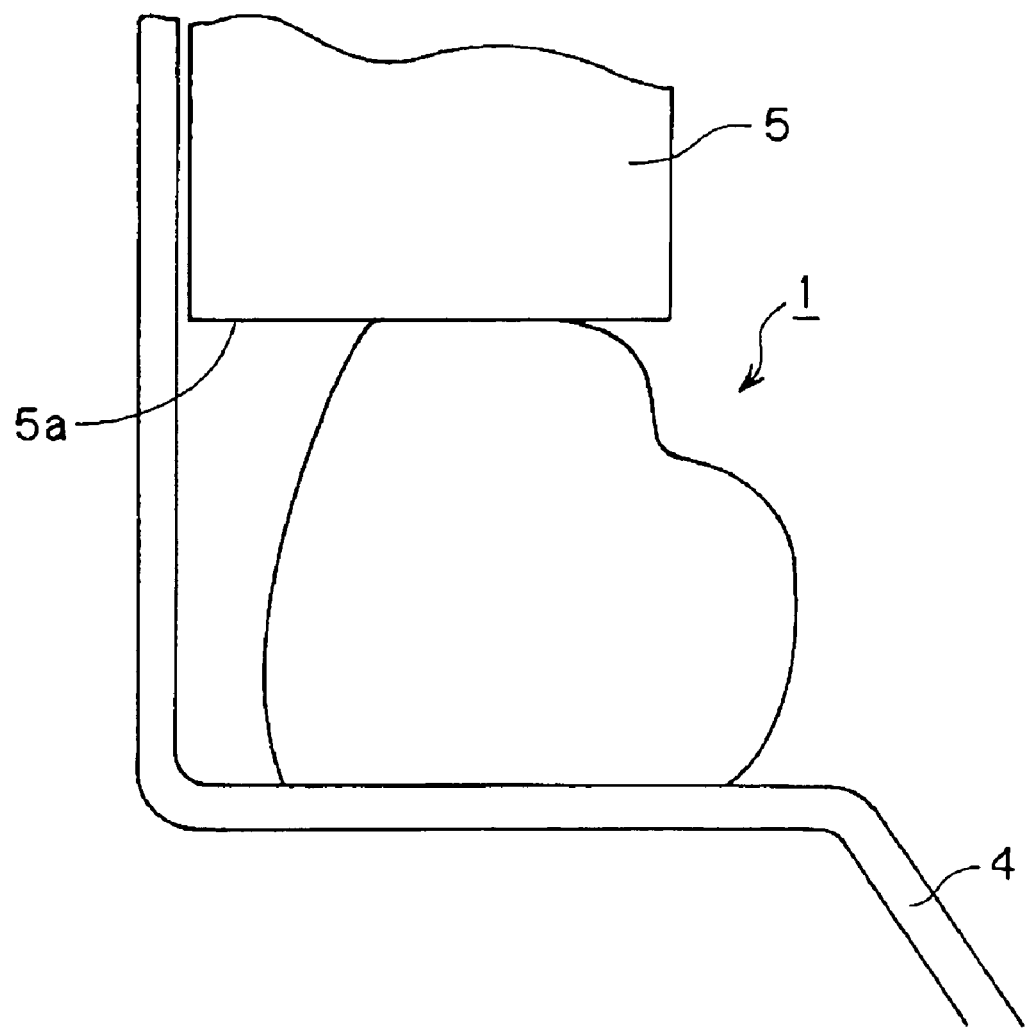
FIG. 2 is a cross-sectional view showing a state of use of the gasket according to the first embodiment.
Figure 3A:
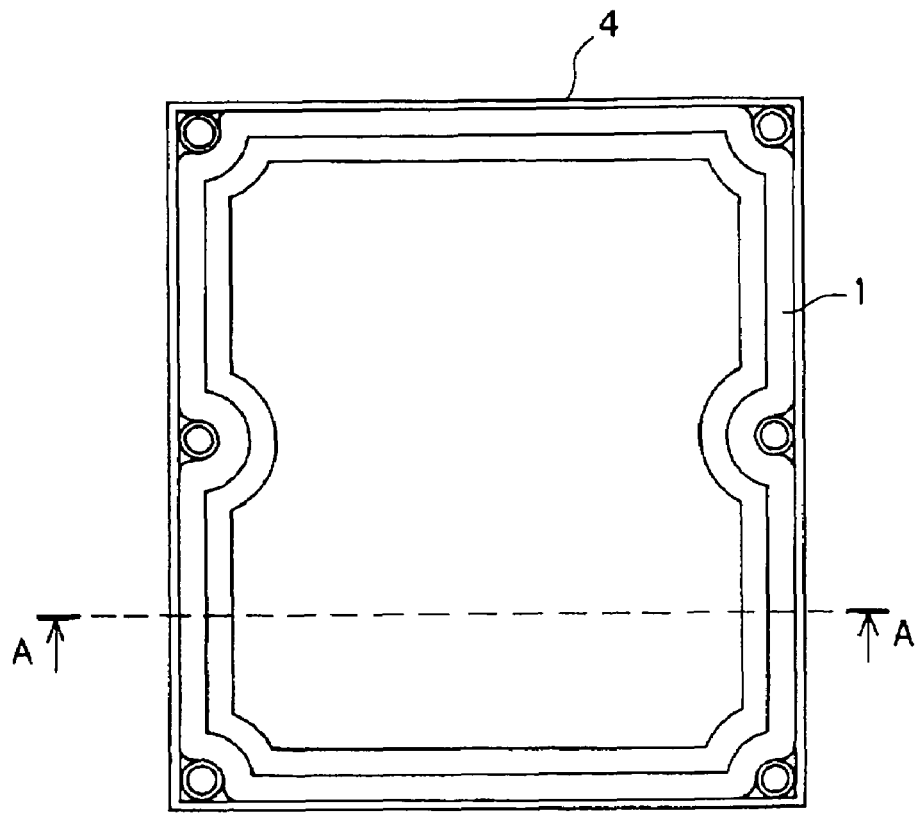
FIGS. 3A and 3B are views showing a top cover to which the gasket according to the first embodiment is attached.
Figure 3B:
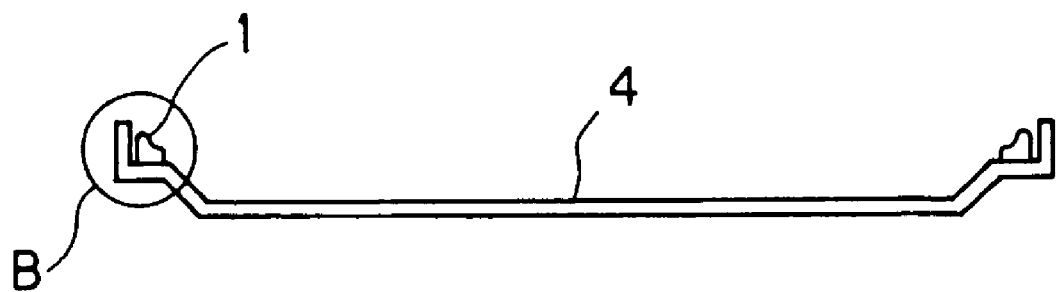
Figure 4:
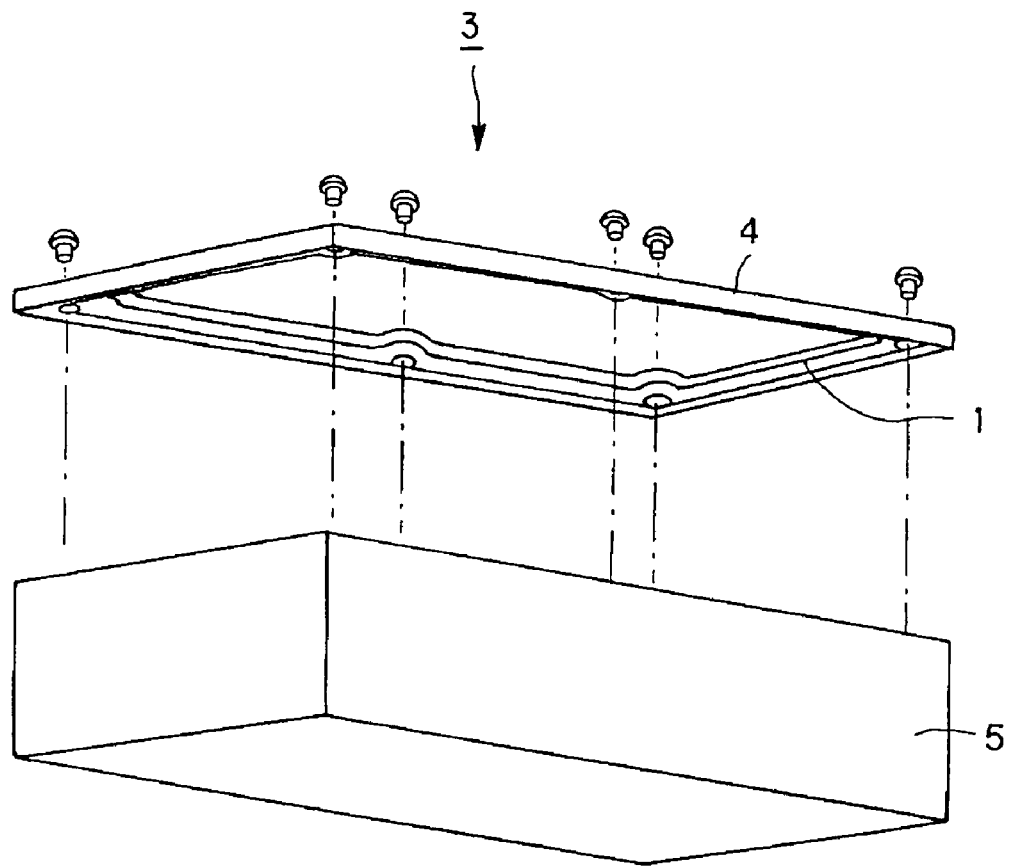
FIG. 4 is a view showing a top cover to which the gasket according to the first embodiment is attached and a hard disk box body.

FIG. 1 is a schematic cross-sectional view showing a gasket 1 according to a first embodiment. FIG. 2 is a schematic cross-sectional view showing the gasket 1 of FIG. 1 in a state of use. FIGS. 3A and 3B are views showing a top cover 4 in which the gasket 1 is used. FIG. 4 is an outlook view of a hard disk unit 3 covered with the top cover 4 of FIGS. 3A and 3B.

As shown in FIG. 4, the gasket 1 is used in the top cover 4 for covering a hard disk box body 5 of the hard disk unit 3. The hard disk box body 5 has a box shape with one surface opened, where components such as a disk are disposed in the inside.

As shown in FIGS. 3A and 3B, the gasket 1 is disposed on the back surface of the top cover 4 to be in contact with the hard disk box body 5. FIG. 3A shows the back surface of the top cover 4. FIG. 3B is a cross section cut along the line A-A of FIG. 3A, where the top cover 4 is displayed upside down. The B-part enlarged view of this FIG. 3A is shown in FIGS. 1 and 2.

The gasket 1 is provided on the top cover 4, and has a cross-sectional shape having one main bead portion 2 on a base 1$a$. That is, the base 1$a$ is bonded to the top cover 4, and the main bead portion 2 that protrudes to the hard disk box body 5 side (upper side in FIG. 1) is provided on the base 1$a$.

Then, this gasket 1 satisfies the following conditions (1) to (4).

(1) $W1/W0<0.9$ where the bonding width of the base 1$a$ bonded to the top cover 4 is W0, and the width at the position of half the height H (½H) from the top cover 4 to the tip end of the main bead portion 2 is W1.

(2) $1.15<H/W0<1.80$ where the height from the top cover 4 to the tip end of the main bead portion 2 is H.

(3) $L/W0 \geqq 3$ where the length of a non-bonded portion around a cross-section excluding a portion of the base 1$a$ bonded to the top cover 4 is L.

(4) The compression ratio at the time when the gasket 1 is compressed between the top cover 4 and the hard disk box body 5 is 13.5% or more.

In addition, it is suitable that the conditions (5) and (6) are satisfied.

(5) The tip end of the main bead portion 2 is R=0.1 mm or more.

(6) The gasket 1 uses a material within a hardness range of 30 to 80 degrees (JIS durometer type A).

Regarding the gasket 1 that satisfies the conditions, an adhesive is applied in advance to the top cover 4; the gasket 1 is injection-molded by inserting the top cover 4 to which the adhesive is applied; and the gasket 1 is integrally provided instantaneously in the top cover 4.

Therefore, since the bonding to the top cover 4 is performed simultaneously in the process of molding the gasket 1, the production process can be simplified.

Here, the gasket 1 is formed with a material made of a thermoplastic elastomer compound.

Regarding a specific thermoplastic elastomer compound, for example, an olefin-series thermoplastic elastomer compound effective particularly in view of heat resistance in the present invention may be used, which is a material where the construction of the olefin-series thermoplastic elastomer contains ethylene/propylene/non-conjugate diene terpolymer rubber or ethylene/propylene copolymer rubber and polypropylene-series resin as well as a plasticizer as major components, and adjusted to have a hardness of 30 to 80 degrees (JIS durometer type A).

Alternatively, a styrene-series thermoplastic elastomer compound, for example, may be used, where the polymer contains a triblock copolymer of styrene-ethylene/propylene-styrene (SEPS) or a triblock copolymer of styrene-ethylene/ethylene.propylene-styrene (SEEPS) as major components and contains a polypropylene-series resin and a plasticizer, and may be a material adjusted to have a hardness of 30 to 80 degrees (JIS durometer type A) and a permanent compression set of 50% or less (JIS K6262 100° C., 72 H).

Alternatively, it may be, for example, a compound obtained by blending an olefin-series thermoplastic elastomer and a styrene-series thermoplastic elastomer, where the construction of the olefin-series thermoplastic elastomer contains ethylene/propylene/non-conjugate diene terpolymer rubber or ethylene/propylene copolymer rubber and polypropylene-series resin as well as a plasticizer as major components, and the styrene-series thermoplastic elastomer is one in which the polymer contains a triblock copolymer of styrene-ethylene/propylene-styrene (SEPS) or a triblock copolymer of styrene-ethylene/ethylene.propylene-styrene (SEEPS) as major components and contains a polypropylene-series resin and a plasticizer, and the compound may be a material adjusted to have a hardness of 30 to 80 degrees (JIS durometer type A).

Further, a urethane-series thermoplastic elastomer or polyethylene-series thermoplastic elastomer adjusted to have a hardness of 30 to 80 degrees (JIS durometer type A) may be used within a range that does not mar the object.

The styrene-series thermoplastic elastomer is such that the polymer is a triblock copolymer of styrene-ethylene/propylene-styrene (SEPS) or a triblock copolymer of styrene-ethylene/ethylene.propylene-styrene (SEEPS) and, at the terminal, a styrene polymer block containing vinyl aromatic compounds as major components, an isoprene polymer block containing conjugate diene compounds as major components, a random copolymer block of ethylene and isoprene, and further a hydrogenated triblock copolymer obtained by hydrogenating a styrene polymer block containing vinyl aromatic compounds as major components are used.

The number-average molecular weight of these hydrogenated triblock copolymers is preferably 50000 or more. If the number-average molecular weight is less than 50000, the bleeding of the softener increases to raise the permanent compression set, which may generate an inconvenience that the polymer cannot be put to actual use. The upper limit of this number-average molecular weight is not particularly limited; however, it is typically about 400000.

It is desirable that the content of amorphous styrene block in the hydrogenated block copolymer is within a range of 10 to 70 wt %, preferably 15 to 60 wt %. Further, it is desirable that the glass transition temperature (Tg) of amorphous styrene block is 60° C. or more, preferably 80° C. or more. Further, the polymer at the portion that links the amorphous styrene blocks at both terminals is also preferably an amorphous one. Here, these hydrogenated block copolymers are mainly used alone; however, two or more kinds may be blended.

The olefin-series thermoplastic elastomer contains ethylene/propylene/non-conjugate diene terpolymer rubber or ethylene/propylene copolymer rubber and polypropylene-series resin as well as a plasticizer as major components.

The ethylene/propylene/non-conjugate diene terpolymer rubber has an ethylene content within a range of 50 to 80 wt %, and an iodine value within a range of 10 to 25. As the non-conjugate diene rubber, dicyclopentadiene, 1,4-hexadiene, dicyclooctadiene, methylenenorbornene, ethylidenenorbornene, or the like is used.

The ethylene/propylene copolymer rubber has an ethylene content of 10 to 25 wt %, and the melt flow index (MFR) thereof (according to JIS K7210 230° C., 2.16 kg load) is 3 to 30 g/10 min.

The polypropylene-series resin is a thermoplastic resin obtained by polymerizing propylene in the presence of a catalyst, and is a crystalline polymer assuming an isotactic, syndiotactic structure or the like, or a copolymer of these with a small amount of α-olefin (for example, ethylene, 1-butene, 1-hexene, 4-methyl1-pentene, or the like). Among these, one having a melt flow index (MFR) (according to JIS K7210 230° C., 2.16 kg load) of 0.1 to 100 g/10 min and a crystallinity of 20 to 70% is preferable. If the MFR is smaller than 0.1, the fluidity will be poor, and it is not possible to obtain an intended moldability. If the MFR is larger than 100, it is not possible to obtain a sufficient physical property.

The plasticizer is one used in a general rubber or thermoplastic elastomer and is, for example, a petroleum-series softener such as process oil, lubricating oil, or paraffin-series oil, a fatty-oil-series softener such as castor oil, linseed oil, colza oil, or coconut oil, or an ester-series plasticizer such as dibutyl phthalate, dioctyl phthalate, dioctyl adipate, or dioctyl sebacate. Further, a cross-linking agent or a cross-linking aid such as organic peroxide or the like may be added to these, or these necessary components may be simultaneously mixed and kneaded while heating and melting for dynamic cross-linking.

Here, to the composition of the gasket 1, a scaly inorganic filler, specifically, clay, diatomaceous earth, talc, barium sulfate, calcium carbonate, magnesium carbonate, metal oxide, mica, graphite, aluminum hydroxide, or the like, such as blended generally in rubber or a thermoplastic elastomer, may be used. Also, a powdery solid filler, for example, metal powder of various kinds, glass powder, ceramics powder, granular or powder polymer, or the like, or an anti-aging agent, for example, amine and derivatives thereof, imidazoles, phenols and derivatives thereof, waxes, or the like, is used.

Also, various additives, for example, a stabilizer, a tackifier, a releaser, a pigment, a fire retardant, a lubricant, and others can be added. Also, for improvement of wearability, moldability, and the like, a small amount of thermoplastic resin or rubber can be added. Further, for improvement of strength and rigidity, short fibers and the like can be added.

These blends regarding styrene-series thermoplastic elastomers and olefin-series thermoplastic elastomers can be easily produced by melt-kneading with the use of a heating kneader, for example, a single screw extruder, a twin screw extruder, a roll, a Banbury mixer, a Prabender, a kneader, a high-shear type mixer, or the like, adding a cross-linking agent or a cross-linking aid such as organic peroxide as desired, or simultaneously mixing these necessary components and kneading while heating and melting. Also, a thermoplastic material obtained by kneading a polymer organic material and a softener can be prepared in advance, and this material can be further mixed with one or more kinds of polymer organic materials of the same kind as or different kinds from the one used here for production.

The compound thus obtained by blending styrene-series thermoplastic elastomers and olefin-series thermoplastic elastomers can be molded into a desired shape by a known method, for example, injection molding or extrusion molding and can be used as a gasket material. Such a gasket material is suitably used particularly for a hard disk unit that requires a high dust resistance; however, it can be used at any other site that requires air-tightness as an ordinary gasket material or a packing material.

By using such a material in the gasket 1, the performance is not deteriorated and the product quality is improved even if it is exposed to a higher temperature of 100° C. or more as an environment of use.

Further, an adhesive applied between the top cover 4 before a molding gasket 1 is a type based on denatured olefin-series resin or a liquidified type based on styrene-butadiene rubber. Alternatively, they may be blended with cross-linking components and denatured to have a thermosetting property.

A specific adhesive is, for example, as follows. A denatured polyolefin-series resin, which is obtained by grafting a polar group (maleic anhydride, acrylic acid, epoxy group hydroxyl group, or the like) to the side chain of the polyolefin-series resin, is liquidified by dissolving it into an aromatic or aliphatic organic solvent or made into a dispersion. Alternatively, liquidified styrene-butadiene rubbers, which are obtained by dissolving them into an aromatic or aliphatic organic solvent, are used alone or mixed. Alternatively, these may be imparted with a cross-linking portion with peroxide, isocyanate, or the like.

As a method of applying the adhesive, an optimal method is selected in accordance with the needs, such as immersion application, spray application, screen printing, brush application, stamp method, dispenser, or the like.

Here, as the top cover 4, a metal plate, for example, an aluminum plate, an aluminum plate subjected to a plating treatment, a stainless steel plate, a vibration-damping steel plate made of stainless steel, or the like is used.

For example, as an aluminum material such as an aluminum plate, one having a surface roughness Ra (according to JIS B0601: as measured by a surface roughness shape measuring apparatus) of 0.1 to 5 μm, preferably 0.3 to 3 μm is used. If those having a surface roughness below this are used, the bonding property of the gasket 1 to aluminum considerably decreases. On the other hand, if those having a surface roughness beyond this are used, the decrease in the mechanical strength of the product metal portion is considerable, and it cannot be put into actual use.

In the positive surface oxide film treatment of such an aluminum material, an acidic solution of an inorganic acid such as sulfuric acid, phosphoric acid, or chromic acid or an organic acid such as oxalic acid is used, and a positive oxidation is carried out to form a porous film on the aluminum surface. By ensuring a positive oxidation time to be a predetermined period of time or more, a porous film thickness is ensured, and also the number of fine pores increases according as the applied voltage becomes lower to provide an advantageous joining property to the gasket 1; however, it is sufficient if pores are formed in relation to the processing cost. For example, in the case of an aqueous solution of about 5 to 25 wt % sulfuric acid, the processing time is about 10 to 60 minutes under an applied voltage of about 10 to 30 V. The thickness of the porous film is at that time about 1 to 50 μm, and the number of pores is about 10 to 1000×10$^9$/cm$^2$; however, it is preferable that the film thickness is about 30 to 50 μm, and the number of pores is 100 to 1000×10$^9$/cm$^2$.

After the positive pole oxidation surface film treatment, an adjustment to make the closed pore ratio be 40% or less, preferably to perform an unclosed pore treatment is carried out. Regarding the closed pore treatment, a method such as hot water treatment or an acid treatment can be selected, and one having a closed pore ratio of 40% or less by being subjected to a closed pore treatment is excellent in bonding property, and one that is not subjected to a closed pore treatment at all is the most preferable.

Then, the gasket 1 having the configuration is brought into contact with the top cover 4 and contact surface 5a of the hard disk box body 5 from the main bead portion 2 to seal between the top cover 4 and the hard disk box body 5, as shown in FIG. 2.

When this sealing between the top cover 4 and the hard disk box body 5 is carried out, the main bead portion 2 is mainly compressed to be in a deformed state shown in FIG. 2.

In the present embodiment described above, squeeze-out is not produced even if a pressure is applied to the gasket 1 from the hard disk box body 5 at the time of attachment, thereby preventing the squeeze-out from being brought into contact with other components to raise a problem. Further, since the height of the gasket 1 is sufficiently ensured, the gasket 1 is compressed with certainty to the hard disk box body 5, whereby the sealing property is ensured, and the penetration of gas, dust, and the like can be prevented.

(Evaluation Test)

In order to evaluate the effect in the above-described embodiment, an evaluation test was conducted for comparison specifically on the Examples constructed within the set range of the above-described embodiment and the Comparative Examples constructed outside of the set range. For the evaluation test, various samples of Examples 1 to 11 and Comparative Examples 1 to 9 were prepared, as shown in FIG. 5, as the construction of the Examples and Comparative Examples, and various evaluations were made on sealing property (presence or absence of leakage), counterforce, squeeze-out at the time of attachment, hardness, outgassing property, moldability, bonding property, and presence or absence of buckling.

"Sample Preparation"

In the present evaluation test, various thermoplastic elastomer compounds described above are used. The compounds are obtained by measuring a predetermined amount of various blends and mix-extruding with a twin screw extruder (manufactured by KOBE STEEL., LTD.: Hyper KTX46) under the condition of a set temperature of 290 to 180° C. and a rotation speed of 150 rpm.

This material is molded into test sheets (150×150×2 mm) with the use of an injection-molding apparatus (Kawaguchi, Ltd.: KM-80) at a set temperature of 290 to 180° C., an injection speed of 0.5 second, an injection pressure of 100 MPa, and a cycle time of 30 seconds for use in the test of hardness and outgassing property.

Further, a component obtained by applying various adhesives on an aluminum plate (treated with non-electrolytic nickel plating 2 to 5 μm) shaped in advance to have a cover shape in a similar manner is inserted into a mold, and the gasket is molded onto the cover at an injection speed of 0.5 second, an injection pressure of 100 MPa, and a cycle time of 30 seconds. With the use of this cover-integrated type gasket, tests on the sealing property, counterforce, squeeze-out at the time of attachment, moldability, bonding property, and the presence or absence of buckling were carried out.

Here, as the adhesive, a denatured olefin-series resin adhesive (manufactured by Mitsui Chemicals, Inc., Ltd., trade name: Unistole R120K) or a styrene-butadiene rubber series adhesive (manufactured by NOGAWA CHEMICAL Co., Ltd., trade name: Diabond DA3188) was used.

Figure 6:
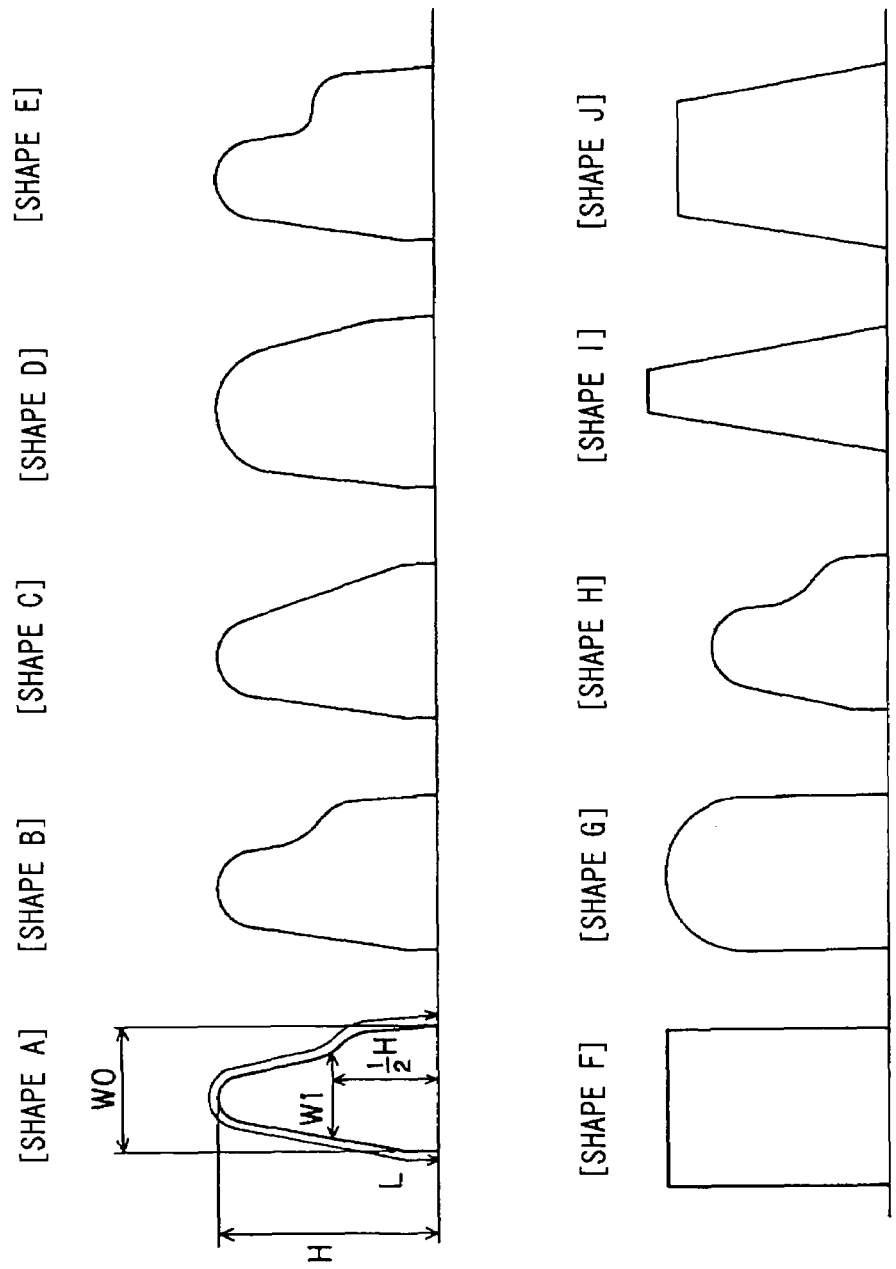
FIG. 6 is a cross-sectional view showing cross-sectional shapes of samples used in the evaluation experiment.

The cross-section shapes of the gasket are shapes A to J shown in FIG. 6, where shape A is such that "R of the tip end of the main bead portion (hereafter referred to as Z-part)"=0.15 mm, W1/W0=0.66, H/W0=1.75, and L/W0=3.81, shape B is such that "R of the Z-part"=0.25 mm, W1/W0=0.81, H/W0=1.40, and L/W0=3.20, shape C is such that "R of the Z-part"=0.25 mm, W1/W0=0.74, H/W0=1.40, and L/W0=3.12, shape D is such that "R of the Z-part"=0.40 mm, W1/W0=0.85, H/W0=1.27, and L/W0=3.00, shape E is such that "R of the Z-part"=0.30 mm, W1/W0=0.70, H/W0=1.15, and L/W0=3.00, shape F is such that "R of the Z-part" is absent, W1/W0=1.00, H/W0=1.40, and L/W0=3.80, shape G is such that "R of the Z-part"=0.50 mm, W1/W0=1.00, H/W0=1.40, and L/W0=3.37, shape H is such that "R of the Z-part"=0.25 mm, W1/W0=0.68, H/W0=1.15, and L/W0=2.67, shape I is such that "R of the Z-part" is absent, W1/W0=0.68, H/W0=1.89, and L/W0=4.15, and shape J is such that "R of the Z-part" is absent, W1/W0=0.80, H/W0=1.10, and L/W0=3.01.

Specific constructions of the various samples of Examples 1 to 11 and Comparative Examples 1 to 9 prepared as shown in FIG. 5 by selecting the above-described shapes are shown below.

Example 1

As thermoplastic elastomer compound, an olefin-series thermoplastic elastomer compound is used. As the gasket cross-section shape, shape A was used. The hardness is 45 degrees (JIS durometer type A).

Example 2

As thermoplastic elastomer compound, an olefin-series thermoplastic elastomer compound is used. As the gasket cross-section shape, shape B was used. The hardness is 45 degrees (JIS durometer type A).

Example 3

As thermoplastic elastomer compound, an olefin-series thermoplastic elastomer compound is used. As the gasket cross-section shape, shape C was used. The hardness is 45 degrees (JIS durometer type A).

Example 4

As thermoplastic elastomer compound, an olefin-series thermoplastic elastomer compound is used. As the gasket cross-section shape, shape D was used. The hardness is 45 degrees (JIS durometer type A).

Example 5

As thermoplastic elastomer compound, an olefin-series thermoplastic elastomer compound is used. As the gasket cross-section shape, shape E was used. The hardness is 45 degrees (JIS durometer type A).

Example 6

As thermoplastic elastomer compound, an olefin-series thermoplastic elastomer compound is used. As the gasket cross-section shape, shape B was used. The hardness is 61 degrees (JIS durometer type A).

Example 7

As thermoplastic elastomer compound, a styrene-series thermoplastic elastomer compound is used. As the gasket cross-section shape, shape B was used. The hardness is 33 degrees (JIS durometer type A).

Example 8

As thermoplastic elastomer compound, a styrene-series thermoplastic elastomer compound is used. As the gasket cross-section shape, shape D was used. The hardness is 33 degrees (JIS durometer type A).

Example 9

As thermoplastic elastomer compound, a polyurethane-series thermoplastic elastomer compound is used. As the gasket cross-section shape, shape B was used. The hardness is 78 degrees (JIS durometer type A).

Example 10

As thermoplastic elastomer compound, a styrene-series thermoplastic elastomer compound is used. As the gasket cross-section shape, shape B was used. The hardness is 60 degrees (JIS durometer type A).

Example 11

As thermoplastic elastomer compound, a styrene-series thermoplastic elastomer compound is used. As the gasket cross-section shape, shape A was used. The hardness is 31 degrees (JIS durometer type A).

Comparative Example 1

As thermoplastic elastomer compound, an olefin-series thermoplastic elastomer compound is used. As the gasket cross-section shape, shape F was used. The hardness is 45 degrees (JIS durometer type A).

Comparative Example 2

As thermoplastic elastomer compound, an olefin-series thermoplastic elastomer compound is used. As the gasket cross-section shape, shape G was used. The hardness is 45 degrees (JIS durometer type A).

Comparative Example 3

As thermoplastic elastomer compound, an olefin-series thermoplastic elastomer compound is used. As the gasket cross-section shape, shape H was used. The hardness is 45 degrees (JIS durometer type A).

Comparative Example 4

As thermoplastic elastomer compound, an olefin-series thermoplastic elastomer compound is used. As the gasket cross-section shape, shape I was used. The hardness is 45 degrees (JIS durometer type A).

Comparative Example 5

As thermoplastic elastomer compound, an olefin-series thermoplastic elastomer compound is used. As the gasket cross-section shape, shape J was used. The hardness is 45 degrees (JIS durometer type A).

Comparative Example 6

As thermoplastic elastomer compound, a styrene-series thermoplastic elastomer compound is used. As the gasket cross-section shape, shape D was used. The hardness is 15 degrees (JIS durometer type A).

Comparative Example 7

As thermoplastic elastomer compound, an olefin-series thermoplastic elastomer compound is used. As the gasket cross-section shape, shape D was used. The hardness is 83 degrees (JIS durometer type A).

Comparative Example 8

As thermoplastic elastomer compound, a styrene-series thermoplastic elastomer compound is used. As the gasket cross-section shape, shape D was used. The hardness is 25 degrees (JIS durometer type A).

Comparative Example 9

As thermoplastic elastomer compound, a styrene-series thermoplastic elastomer compound is used. As the gasket cross-section shape, shape A was used. The hardness is 25 degrees (JIS durometer type A).

"Evaluation Method"

In the present evaluation test, specifically the following evaluations were made.

(1) Sealing Property (Presence or Absence of Leakage)

In a state in which a gasket integrally molded to a cover was mounted on a real apparatus leakage tester, a positive pressure of 1.5 kPa was kept being applied for 30 seconds from the inside of the tester, and whether the leakage occurred or not was examined after 15 seconds. The leakage occurs when the permanent compression set property of the gasket material is inferior or when the gasket shape has defects. In the present test, determination was made as "leakage absent: ○, leakage present: x".

(2) Counterforce

The counterforce of a gasket integrally molded to a cover was measured. In order to provide a seal, it must have a suitable contact surface pressure. The surface pressure can be measured as a counterforce. When the surface pressure is low, a sufficient seal cannot be provided if the cover or an opposing member has recesses and protrusions. Further, a high surface pressure causes deformation of the cover. Determination was made with a criterion of "preferable counterforce 0.2 to 1.0 (N/mm): ○, otherwise: x".

(3) Squeeze-Out at the Time of Attachment

An opposing contact surface was actually pressed onto a gasket integrally molded to a cover to examine whether a squeeze-out is produced or not in a deformed state in which the gasket is compressed. In the present test, determination was made as "squeeze-out absent: ○, squeeze-out present: x".

(4) Hardness

Three test sheets each having a thickness of 2 mm were superposed, and the measurement was carried out according to JIS K6253. The present test result is a confirmation of the condition of "the gasket uses a material within a hardness range of 30 to 80 degrees (JIS durometer type A)" that the gasket should satisfy.

(5) Outgassing Property

A test piece having a short strip shape of 50×3×2 mm was heat-extracted at 120° C. for one hour, and the amount of outgas (μg/g) at that time was measured. In the present test, determination was made as "outgas amount is less than 50 (μg/g): ○, outgas amount is 50 (μg/g) or more: x".

(6) Moldability

In the injection molding of a product, determination was made as "inconvenience absent: ○, inconvenience present: x". Here, the inconvenience means that it cannot be molded into a predetermined product shape, and refers to generation of deformation, sinkmark, cutout, weld, short shot, burr, or the like or generation of a phenomenon such that the product cannot be integrally molded to a cover.

(7) Bonding Property

A through-peeling of about 1 mm was formed on a gasket bonding surface integrally molded to a cover, and a wire made of SUS was put through the site. A vertical tensile load was applied, and the load by which the peeling length extended to about 10 mm was measured. In the present test, determination was made as "peeling load is 100 (kPa) or more: ○, peeling load is less than 100 (kPa): x".

(8) Presence or Absence of Buckling

An opposing contact surface was actually pressed onto a gasket integrally molded to a cover to examine whether buckling occurs or not in a deformed state in which the gasket is compressed. In the present test, determination was made as "buckling absent: ○, buckling present: x".

"Evaluation Results"

When the hardness is 80 degrees or more, the counterforce will be large at the time of attachment when the cover-integrated type gasket is pressed onto an opposing contact surface, whereby the deformation or the like of the cover occurs; a complete seal cannot be provided; and it will be inferior in the sealing property as a gasket. On the other hand, when the hardness is less than 30 degrees, outgas will be large in amount, and also one must take care in handling because the gasket is liable to be torn off or is liable to adhere. The most preferable hardness is 40 to 60 degrees.

On the other hand, in order to obtain a desired moldability and hardness, a polypropylene-series resin and a plasticizer are essential. However, if the amount of polypropylene-series resin is too much, the hardness will be high, whereas if the amount is too small, the fluidity will be poor, making the injection forming be difficult. A preferable amount of polypropylene-series resin is 10 to 100 parts by weight with respect to 100 parts by weight of the polymer. Similarly, if the amount of plasticizer is too much, the amount of outgas will be large, hence not preferable. A preferable amount of plasticizer is 10 to 200 parts by weight.

If an adhesive is not used, peeling is generated at the time of molding, so that the integral molding was not possible. If an epoxy series or cyanoacrylate series is used as an adhesive, the peeling easily occurs and it was not possible to obtain a sufficient bonding force though the integral molding is possible.

Specific evaluation results on various samples of Examples 1 to 11 and Comparative Examples 1 to 9 based on the above evaluations are shown in FIG. 5.

From the results described above, the configuration shown in Examples 1 to 11 establish a cover-integrated type gasket having an extremely excellent performance.

Figure 7:
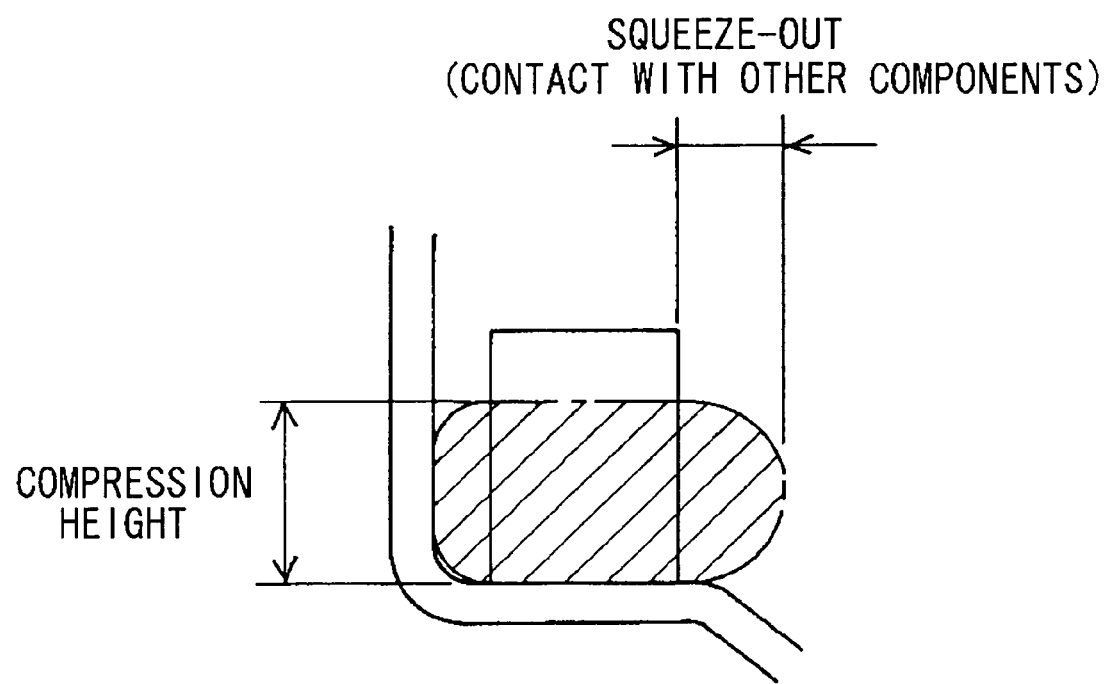
FIG. 7 is a cross-sectional view showing a state in which squeeze-out has occurred in the evaluation experiment.
Figure 8:
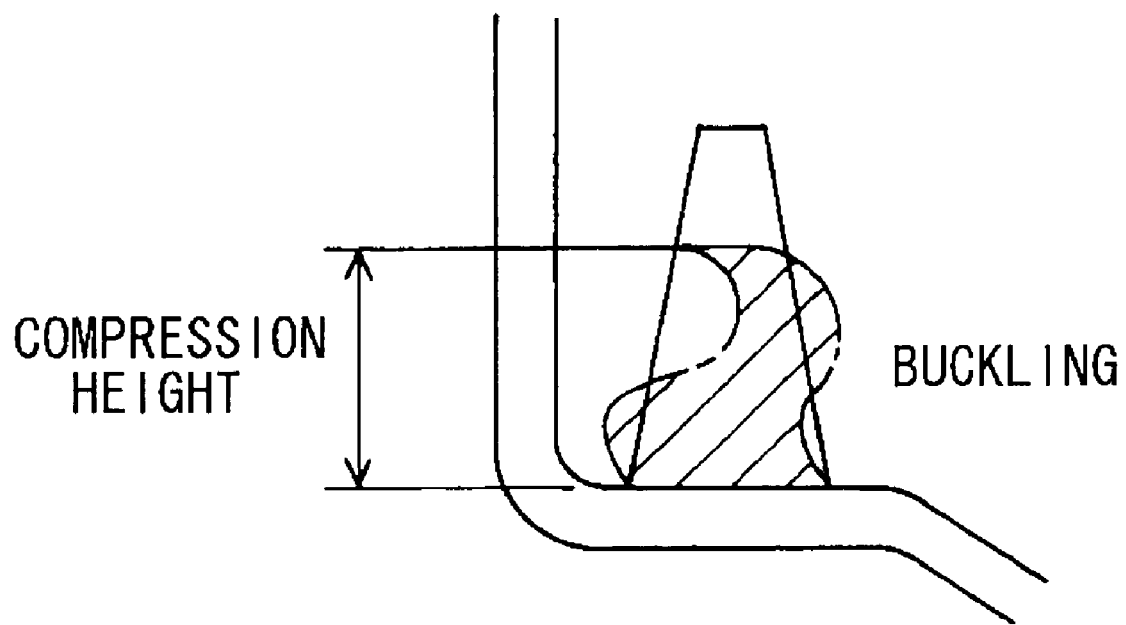
FIG. 8 is a cross-sectional view showing a state in which buckling has occurred in the evaluation experiment.

On the other hand, the constructions shown in Comparative Examples 1 to 9 have some defects. For example, the squeeze-out at the time of attachment in Comparative Example 1 is produced as shown in FIG. 7. Also, the buckling in Comparative Example 4 occurs as shown in FIG. 8.

Second Embodiment

In the gasket 1 of the above-described first embodiment, it was further desired to solve the following problem.

Figure 9:
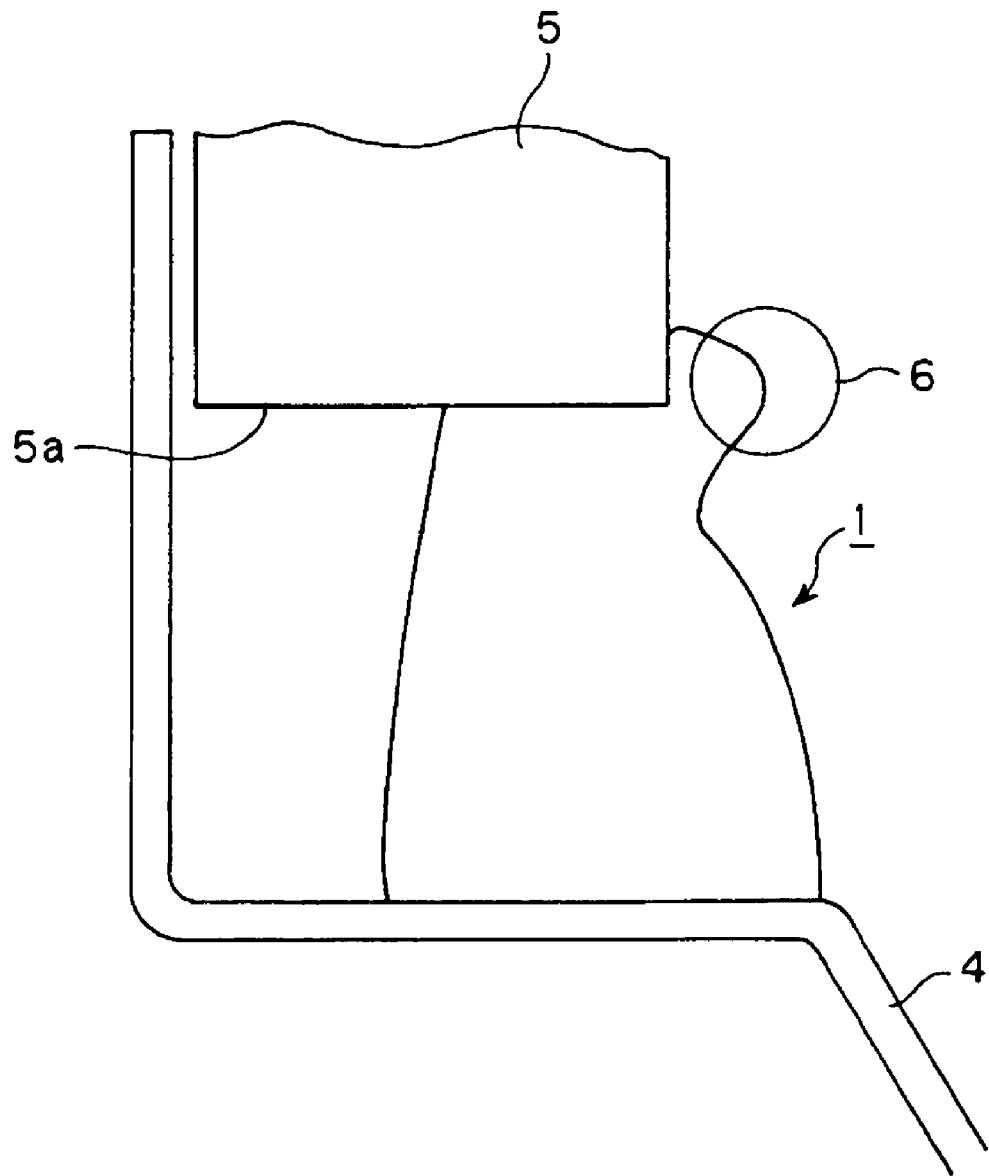
FIG. 9 is a cross-sectional view showing a problem of the gasket.

Even with the gasket 1 of the first embodiment, depending on the bonding position at which the gasket 1 is bonded to the top cover, the gasket 1 may squeeze out from contact surface 5a to produce a squeeze-out portion 6 by being compressed when attached to the hard disk box body 5, as shown in FIG. 9. When squeeze-out portion 6 is produced, there will be a danger such that the gasket 1 is brought into contact with other components such as a disk, in the same manner as the prior art, and also the sealing property itself will decrease because the gasket 1 and contact surface 5a are not in firm contact.

Therefore, the second embodiment provides a high-performance the gasket that prevents squeeze-out with more certainty than in the above-described first embodiment and maintains a sealing property.

Figure 10:
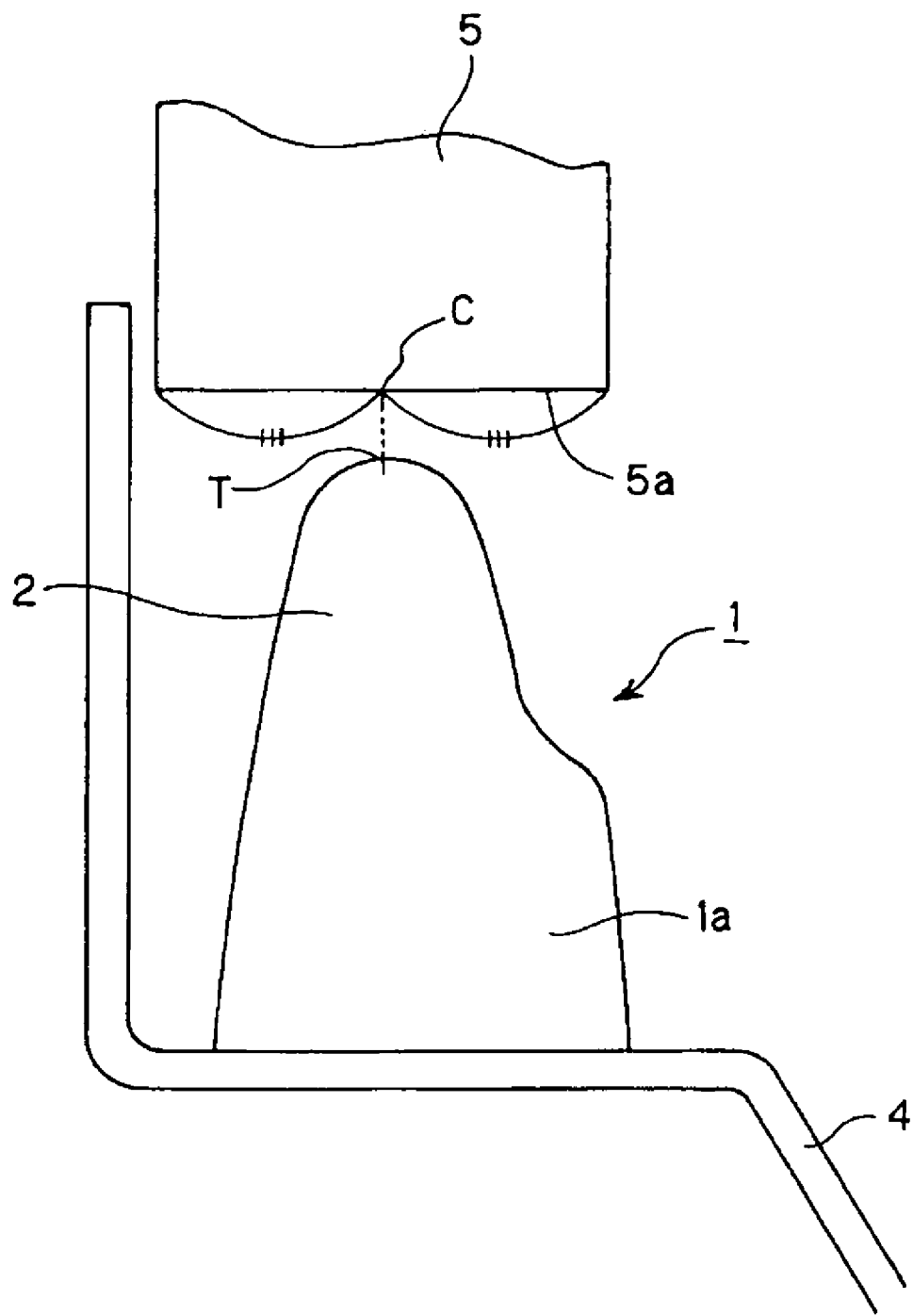
FIG. 10 is a cross-sectional view showing a gasket according to a second embodiment of the present invention.
Figure 11:
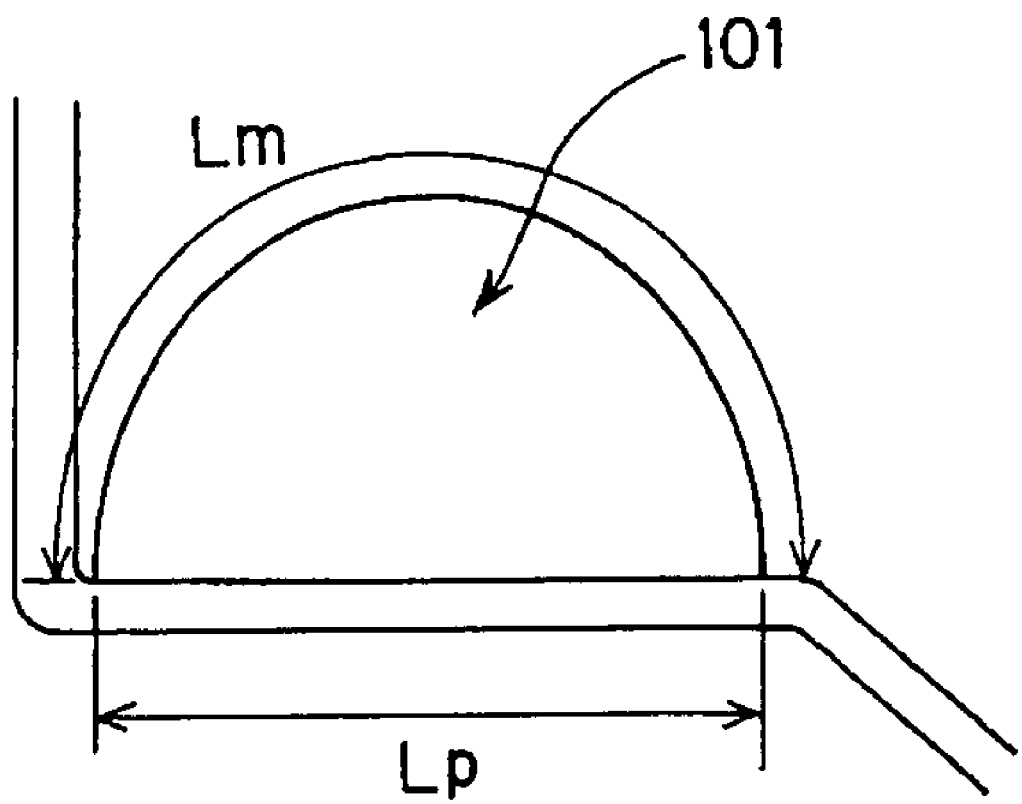
FIG. 11 is a cross-sectional view showing a gasket of a conventional art.
Figure 12:
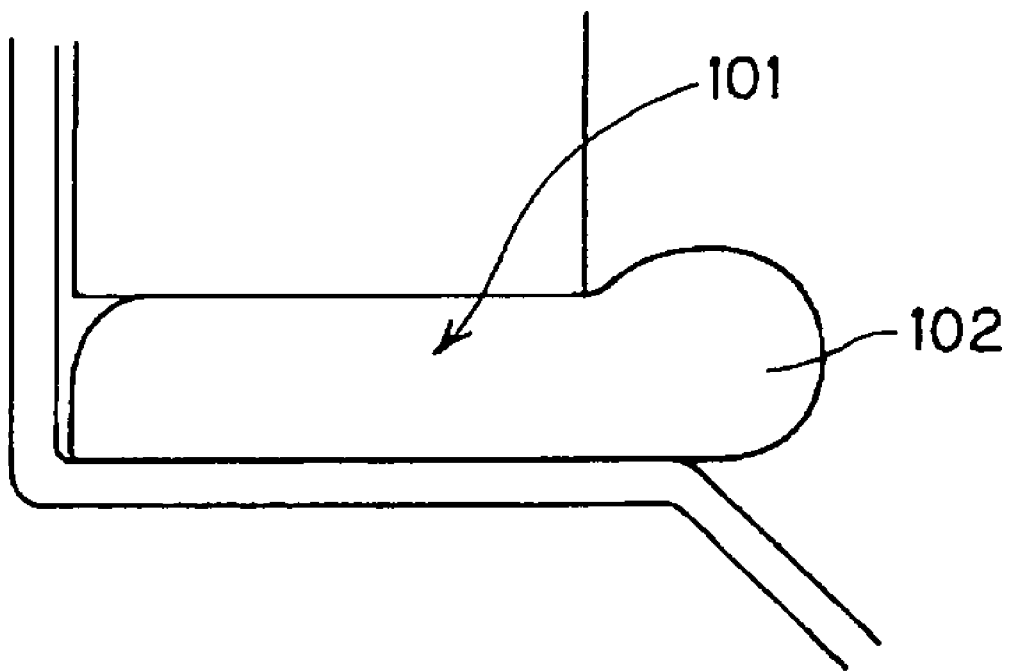
FIG. 12 is a cross-sectional view showing a problem of a gasket of a conventional art.
Figure 13:
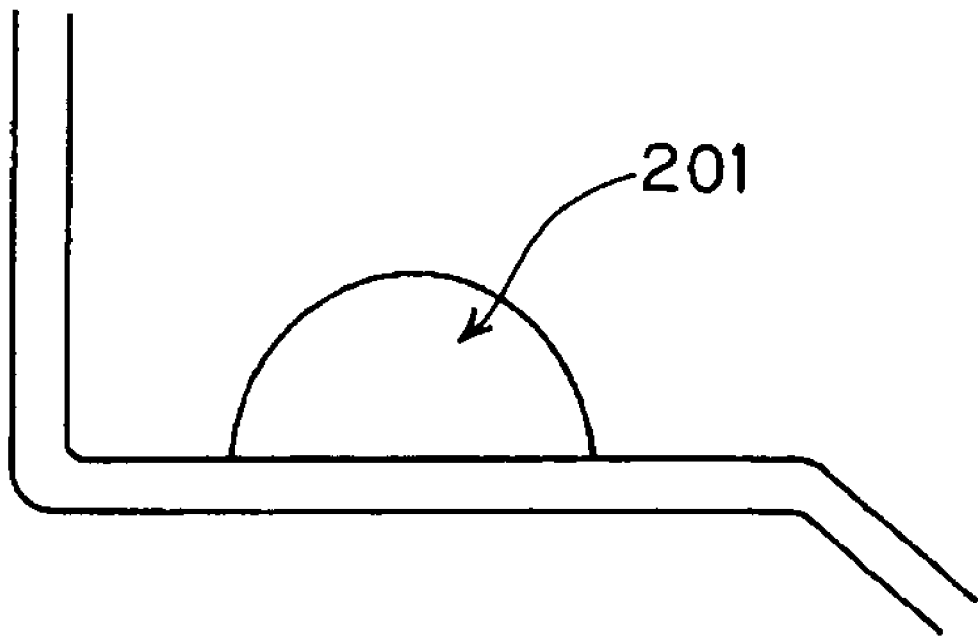
FIG. 13 is a cross-sectional view showing a problem of a gasket of a conventional art.

FIG. 10 is a view showing a gasket 1 according to a second embodiment. Here, the shape, material, and the like of each member are the same as in the first embodiment, so that the description thereof will be not repeated.

The gasket 1 of FIG. 10 is provided on the top cover 4 and has a cross-sectional shape having one main bead portion 2 on the base 1a. That is, the base 1a is bonded to the top cover 4, and the main bead portion 2 that protrudes to the hard disk box body 5 side (upper side in FIG. 10) is provided on the base 1a.

Further, in relative relationship with the gasket 1, the gasket 1 is disposed at a position at which the center C of the width of contact surface 5a of the hard disk box body 5 and the tip end T of the main bead portion 2 opposes each other. That is, at the time of attachment, the tip end T of the main bead portion 2 is brought into contact with the center C of the width of contact surface 5a of the hard disk box body 5.

Then, the gasket 1 having the above-described configuration is brought into contact with the hard disk box body 5 to seal between the top cover 4 and the hard disk box body 5, as shown in FIG. 2 of the first embodiment.

Therefore, the main bead portion 2 of the gasket 1 is brought into contact with the hard disk box body 5 with certainty without squeezing out from the width of contact surface 5a of the hard disk box body 5, thereby exhibiting a sealing property.

INDUSTRIAL APPLICABILITY

As described above, in the present invention, squeeze-out is not produced even if a pressure is applied to the gasket from the other member at the time of attachment, thereby preventing the squeeze-out from being brought into contact with other components to raise a problem. Further, since the height of the gasket is sufficiently ensured, the gasket is compressed with certainty to the other member, whereby the sealing property is ensured, and the penetration of gas, dust, and the like can be prevented.

What is claimed is:

1. A sealed hard disk unit comprising
a hard disk box body including a hard disk drive,
a metal top cover sealing said hard disk box body,
an injection molded gasket secured to said top cover, said gasket sealing between said metal top cover and said hard disk box body,
said metal top cover having a surface roughness of 0.1 to 5 µm where the injection molded gasket is secured to said metal top cover,
said gasket including a material within a hardness range of 30 to 80 degrees (JIS durometer type A),
said gasket having a low outgassing property of less than 50 µg/g preventing error operation of the hard disk drive by components of outgas from the gasket adhering to the hard disk drive,
said gasket having a base portion on the top cover and a main bead portion protruding from the base portion to the hard disk box body,
a center of a tip of the main bead portion contacting a center of a width of a contact surface of the hard disk box body, the main bead portion avoiding squeezing out from the contact surface of the hard disk box body while sealing between the hard disk box body and the metal top cover and avoiding outgassing of the injection molded gasket from damaging the hard disk drive, and
said gasket having two opposite sides formed by the base portion and the main bead portion, one side of the gasket located facing an exterior of the hard disk unit having an approximate constant slope from the base portion through the main bead portion, the other side of the gasket facing an interior of the hard disk unit having a slope shifting from an approximate constant slope at the base portion to a different approximate constant slope at the main bead portion, shifting at an approximate midpoint of the other side of the gasket,
all surfaces of the gasket extending transversely to said top cover except for the base portion of the gasket, the base portion of the gasket being the only surface extending parallel to the top cover,
said gasket extending from said top cover in a direction towards said hard disk box body, a height of said gasket being less than a height of said top cover so that gasket is recessed within said top cover,
said gasket having a ratio of
$W1/W0 < 0.9$ where a bonding width of a base bonded to the top cover is $W0$, and a width at a position of half a height from a bonding portion of the base with the top cover to a tip end of a main bead portion is $W1$,
$1.15 < H/W0 < 1.80$ where the height from the bonding portion of the base with the top cover to the tip end of the main bead portion is $H$,
$L/W0 \leq 3$ where a length of a non-bonded portion around a cross-section excluding a portion of the base bonded to the top cover is $L$,
a compression ratio at a time of being compressed between the top cover and the hard disk box body being 13.5% or more, and
the material of the gasket being a heat resistant olefin-series elastomer compound, said gasket withstanding heat of greater than 100° C.

2. A sealed hard disk unit comprising
a hard disk box body including a hard disk drive,
a metal top cover sealing said hard disk box body,
an injection molded gasket secured to said top cover, said gasket sealing between said metal top cover and said hard disk box body, said metal top cover having a surface roughness of 0.1 to 5 μm where the injection molded gasket is secured to said metal top cover, said gasket including a material within a hardness range of 30 to 80 degrees (JIS durometer type A), said gasket having a low outgassing property of less than 50 μg/g preventing error operation of the hard disk drive by components of outgas from the gasket adhering to the hard disk drive, said gasket having a base portion on the top cover and a main bead portion protruding from the base portion to the hard disk box body, a center of a tip of the main bead portion contacting a center of a width of a contact surface of the hard disk box body, the main bead portion avoiding squeezing out from the contact surface of the hard disk box body while sealing between the hard disk box body and the metal top cover and avoiding outgassing of the injection molded gasket from damaging the hard disk drive, and said gasket having two opposite sides formed by the base portion and the main bead portion, one side of the gasket located facing an exterior of the hard disk unit having an approximate constant slope from the base portion through the main bead portion, the other side of the gasket facing an interior of the hard disk unit having a slope shifting from an approximate constant slope at the base portion to a different approximate constant slope at the main bead portion, shifting at an approximate midpoint of the other side of the gasket, all surfaces of the gasket extending transversely to said top cover except for the base portion of the gasket, the base portion of the gasket being the only surface extending parallel to the top cover, said gasket extending from said top cover in a direction towards said hard disk box body, a height of said gasket being less than a height of said top cover so that gasket is recessed within said top cover, said gasket having a ratio of $W1/W0<0.9$ where a bonding width of a base bonded to the top cover is $W0$, and a width at a position of half a height from a bonding portion of the base with the top cover to a tip end of a main bead portion is $W1$, $1.15<H/W0<1.80$ where the height from the bonding portion of the base with the top cover to the tip end of the main bead portion is $H$, $L/W0 \geqq 3$ where a length of a non-bonded portion around a cross-section excluding a portion of the base bonded to the top cover is $L$, a compression ratio at a time of being compressed between the top cover and the hard disk box body being 13.5% or more.

* * * * *